(12) United States Patent
Medvedev et al.

(10) Patent No.: US 8,960,293 B2
(45) Date of Patent: Feb. 24, 2015

(54) METHOD OF PROPPING AGENT DELIVERY TO THE WELL

(75) Inventors: Oleg Olegovich Medvedev, Odessa (UA); Anatoly Vladimirovich Medvedev, Moscow (RU); John Lassek, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 656 days.

(21) Appl. No.: 12/602,217

(22) PCT Filed: May 30, 2007

(86) PCT No.: PCT/RU2007/000282
§ 371 (c)(1),
(2), (4) Date: May 11, 2010

(87) PCT Pub. No.: WO2008/147241
PCT Pub. Date: Dec. 4, 2008

(65) Prior Publication Data
US 2010/0282464 A1    Nov. 11, 2010

(51) Int. Cl.
*E21B 43/26*    (2006.01)
*E21B 43/267*    (2006.01)

(52) U.S. Cl.
CPC .................................... *E21B 43/267* (2013.01)
USPC .................................... 166/308.1; 166/75.15

(58) Field of Classification Search
None
See application file for complete search history.

(56) References Cited

U.S. PATENT DOCUMENTS

| | | | |
|---|---|---|---|
| 3,490,654 A * | 1/1970 | Fischer | 406/123 |
| 3,592,266 A * | 7/1971 | Tinsley | 166/283 |
| 3,850,247 A | 11/1974 | Tinsley | |
| 4,029,149 A | 6/1977 | Perkins | |
| 4,176,064 A * | 11/1979 | Black | 210/196 |
| 4,569,394 A * | 2/1986 | Sweatman et al. | 166/280.1 |
| 4,726,219 A * | 2/1988 | Pearson et al. | 73/54.04 |
| 4,802,141 A * | 1/1989 | Stegemoeller et al. | 366/132 |
| 4,930,576 A * | 6/1990 | Berryman et al. | 166/308.1 |
| 5,014,218 A | 5/1991 | Crain et al. | |
| 5,411,091 A | 5/1995 | Jennings, Jr. | |
| 5,415,232 A * | 5/1995 | Johnson et al. | 166/307 |
| 5,441,340 A | 8/1995 | Cedillo et al. | |
| 6,114,410 A | 9/2000 | Betzold | |
| 6,328,105 B1 | 12/2001 | Betzold | |
| 6,439,310 B1 | 8/2002 | Scott, III et al. | |

(Continued)

FOREIGN PATENT DOCUMENTS

| | | |
|---|---|---|
| RU | 2253856 | 6/2005 |
| SU | 791950 | 12/1980 |

(Continued)

OTHER PUBLICATIONS

International Search Report for the equivalent PCT patent application No. PCT/RU2007/000282 issued on Mar. 6, 2008.

(Continued)

*Primary Examiner* — Angela M DiTrani

(57) ABSTRACT

A method for producing minerals and, more specifically, for producing hydrocarbons, by hydraulic fracturing of the rock, can be used for the optimization of formation fracturing crack processing conditions. The method includes splitting a main stream of a propping agent suspension in a fluid at a mixer output into at least two flows having different volume delivery rates, and comingling the at least two flows before delivering to the hydraulic fracturing zone.

7 Claims, 2 Drawing Sheets

(56) References Cited

U.S. PATENT DOCUMENTS

| | | | |
|---|---|---|---|
| 7,090,017 B2 * | 8/2006 | Justus et al. | 166/308.1 |
| 7,451,820 B2 * | 11/2008 | Albers et al. | 166/308.6 |
| 2004/0261995 A1 | 12/2004 | Nguyen et al. | |
| 2005/0006089 A1 | 1/2005 | Justus et al. | |
| 2005/0051330 A1 | 3/2005 | Nguyen | |
| 2005/0126780 A1 | 6/2005 | Todd et al. | |
| 2005/0130848 A1 | 6/2005 | Todd et al. | |
| 2005/0274523 A1 | 12/2005 | Brannon et al. | |
| 2006/0048943 A1 | 3/2006 | Parker et al. | |

FOREIGN PATENT DOCUMENTS

| | | |
|---|---|---|
| SU | 791950 A1 | 12/1980 |
| WO | 2005/000993 | 1/2005 |
| WO | 2009005387 | 1/2009 |

OTHER PUBLICATIONS

Office action for the equivalent Mexican patent application No. MX/a/2009/012986 issued on Apr. 9, 2013.

\* cited by examiner

METHOD OF PROPPING AGENT DELIVERY TO THE WELL

CROSS-REFERENCE TO RELATED APPLICATIONS

This is a national stage application based on PCT/RU2007/000282, filed on May 30, 2007. This application claims the priority of the prior application and incorporates its disclosure by reference in its entirety.

BACKGROUND OF INVENTION

1. Field of the Invention

This invention relates to the production of minerals, more specifically, to the production of hydrocarbons, by hydraulic fracturing of the rock, and can be used for the optimization of formation fracturing crack processing conditions.

2. Background Art

Hydraulic fracturing is currently the main method of increasing well delivery by producing new or expanding the existing highly permeable cracks initiating from the well bore to the reservoir bulk.

The standard hydraulic fracturing comprises, as the first step, pumping the working fluid at high pressure and pumping rate into the rock until a crack is initiated in the rock. The second stage comprises pumping the propping agent into the hydraulic fracturing crack so produced. After the fluid pressure is reduced at the end of the overall procedure, the propping agent particles delivered to the crack form a uniform pack and prevent the crack for complete closure.

The permeability of a propping agent packed crack is higher than that of the country rock. Although this method has been known and widely used for many years now, there situations where further increasing the permeability of the propping agent pack to above that provided by the standard technology would provide for a serious economic advantage.

Various well delivery increasing methods are known today.

Known (SU 791950) is a bottomhole formation zone heat treatment method. Under said known method, the bottomhole zone heat treatment procedure comprises pumping a highly heat conductive heat carrier into the formation, such heat carrier being a granulated material, for example, metallic powder acting as the propping agent. The grain size and distribution of said metallic powders are selected based on their pumping efficiency and penetrability into the formation cracks. The prepared suspensions do not penetrate into the pore channels but fill the existing and pumping initiated cracks in the bottomhole formation zone. After a system of granulated metallic powder filled cracks has been produced in the formation, an electric heater is lowered into the well to heat the bottomhole zone.

Said method is complex in implementation because in fact it comprises two stages, i.e. first hydraulic fracturing and then metallic powder pumping into the cracks. Its low efficiency is predetermined by the fact that in order for metallic powder into the cracks, low forces are used that are developed by the volume expansion of the bottomhole zone fluid during heating; therefore heating penetrates to small distances inward the formation.

Known also (U.S. Pat. No. 6,114,410) is a method of increasing the permeability of the formation hydraulic fracturing crack. According to said known method, adhesion of corrosion capable particles are introduced into the propping agent. Said adhesive particles may have a vulcanized resin coating. Said adhesive particles come in contact with similar adhesive particles to form a stable and strong matrix that produces propping agent structures in the crack. This increases, though slightly, the crack permeability and generally improves the efficiency of hydraulic treatment.

However, the efficiency of said method is low.

SUMMARY OF INVENTION

The technical task to be achieved by the invention disclosed herein is to provide a new method of propping agent delivery to the bottomhole formation.

The technical result to be achieved by the invention disclosed herein is to increase well delivery.

Said technical result can be achieved by using the method of propping agent delivery to the well developed herein. In accordance with said method, propping agent is delivered at a variable rate, wherein the main stream of the propping agent suspension in the fluid at the mixer output is split into at least two flows having different volume delivery rates, and before the delivery to the hydraulic fracturing zone said flows are comingled. Different volume delivery rates of the flows passing between the propping agent mixer and the hydraulic fracturing fluid can be achieved by using different delivery pumps for pumping said flows, different diameters of the pipelines over which said flows are pumped, as well as different flow pumping pipeline lengths.

DETAILED DESCRIPTION

Figure 1:
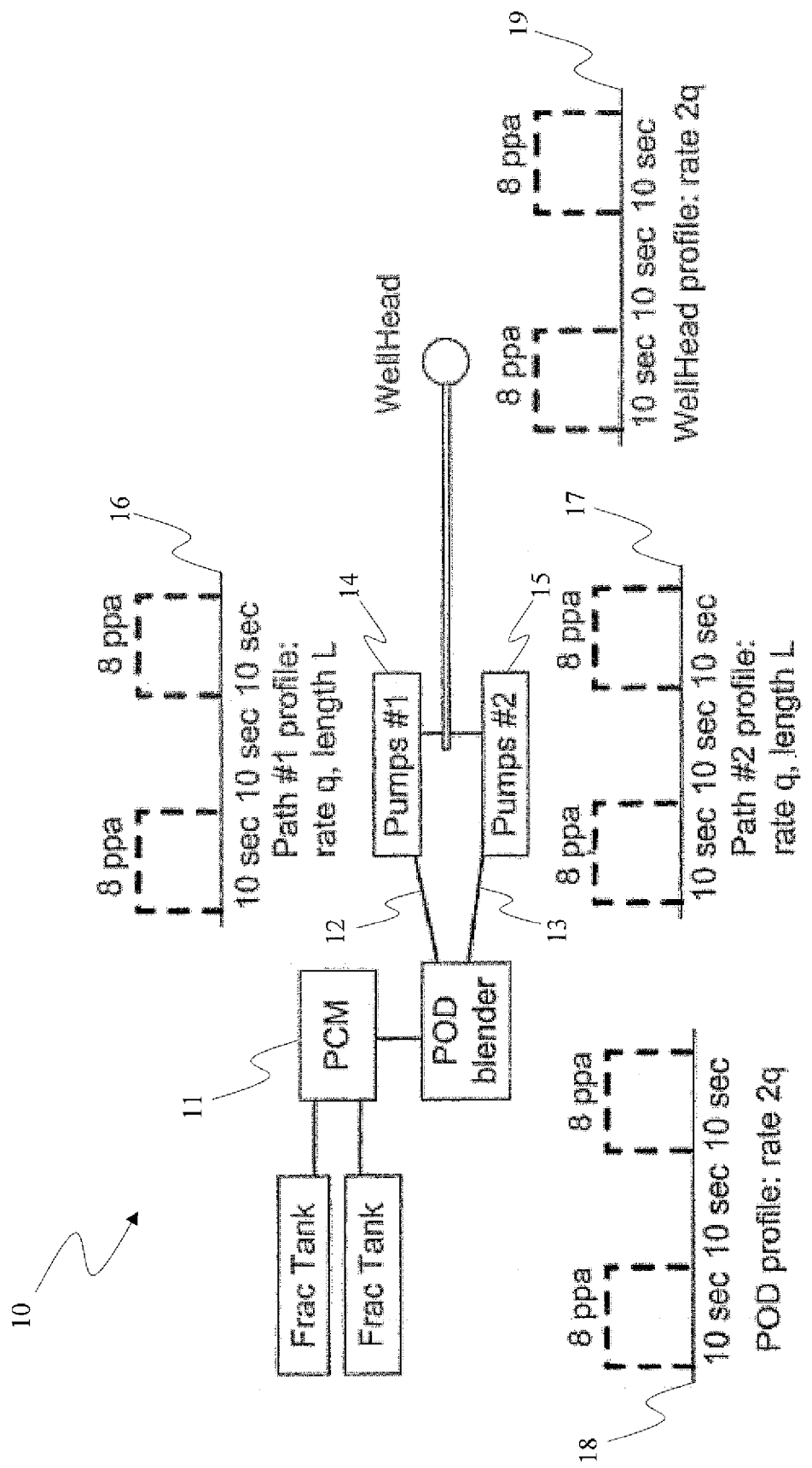
FIG. 1 shows an embodiment in accordance with the present invention.

The technical solution considered herein is a method of optimizing the pumping of propping agent batches aimed at improving the parameters of the nonuniform propping agent pack in the hydraulic fracturing crack.

The technical solution developed herein is a method providing for alternating delivery of propping agent containing and not propping agent containing fluid into the well with adjusting the size of the batches and obtaining batches of pure fluid the size of which is smaller than the maximum allowed size provided by the wellhead equipment. The method is based on delivering a batch of propping agent containing fluid through different routes on the surface (through hydraulic fracturing delivery pumps and pipelines). Propping agent suspension batches are pumped through different routes by splitting the main stream into smaller flows that are further comingled before the final pumping into the well. Controlled choice of batch delivery time delays in each system pipeline combined with a correct choice of propping agent containing fluid batch length allows reducing the intervals of pure fluid pumping into the well.

Generally, the method developed herein comprises the following steps:

correct choice of wellhead equipment including the selection of appropriate pumping rates with hydraulic fracturing pumps and pipeline design (length and diameter) for achieving appropriate delivery time delays over different routes.

choice of initial working fluid batch pumping schedule for hydraulic fracturing pumps with or without propping agent and batch delivery length.

Said technical solution can be used for, but not limited to, the designing of a single network of highly conductive channels in a formation crack. Said channels are produced by heterogeneous filling of the cracks with the propping agent that finally leads to an increase in hydrocarbon inflow through the nonuniform structure crack produced by pumping the propping agent containing working fluid.

In some well treatment situations, alternating delivery of fluid batches with different properties (density, viscosity and addition content), i.e. the so-called propping agent stage and the no propping agent stage. For example, the method of heterogeneous crack filling with a fracturing filler developed herein comprises alternating delivery of pure hydraulic formation fracturing fluid and propping agent containing fluid. After propping agent containing zones are formed in the crack as a result of alternating pumping, said zones keep the crack open. However, if the size of the not propping agent containing fluid batch is greater than the critical one (the minimum critical batch size depends on formation properties), the efficiency of the crack heterogeneously filled with the propping agent may reduce drastically. This is accounted for by the large distance between adjacent columns of the propping agent supports leading to crack closure and crack permeability reduction in the direction from the crack initiation point towards the well.

The propping agent stage as a term used for the purposes of said technical solution means a batch of hydraulic fracturing fluid containing a specific concentration of propping agent particles. It is assumed that in the batches delivered before or after said batch the propping agent concentration is close to zero or, to be more specific, the propping agent concentration in the fluid before or after said batch is far lower than during said batch delivery (the no propping agent stage). The delivery of said propping agent batch (i.e. the cyclic schedule of propping agent concentration variation) can be achieved using the following available method:

1. A propping agent delivery conveyor delivers the propping agent to a mixer in pulsed mode (alternating starts and stops).
2. The propping agent is delivered to said mixer from the container due to gravity. The container valve periodically opens and closes to provide for propping agent containing fluid batches of required length.
3. The propping agent is delivered to said mixer pneumatically. The air compressor operates in alternating mode to turn the air flow on and off and thus create separate propping agent containing fluid batches.

All the methods listed above are limited by the minimum size of a propping agent containing fluid batch (or a not propping agent containing fluid batch). For example, if method 2 is used, the batch size cannot be smaller than a specific level determined either by the capacity of the vortex agitator in said mixer or the product of the ready mixture delivery volume rate and the time required for opening/closing the container valve. A hydraulic fracturing expert can estimate the minimum allowed propping agent containing (or not propping agent containing) batch size obtained using the second method as follows: at an about 8 m³/min delivery rate this volume is about 0.8 m³.

As noted above, the main application of said technical solution is to optimize the design and propping agent preparation and pumping procedure for increasing the efficiency of a nonuniform propping agent structure crack. The importance of said technical solution for the optimization of the parameters of nonuniform pumping agent packs has been confirmed by studies that have shown: the efficiency of hydraulic fracturing with a heavily nonuniform propping agent filling pattern depends on the possibility of achieving relatively small propping agent containing fluid batches and, more importantly, not propping agent containing fluid batches. The required not propping agent containing fluid batch size is usually smaller than the minimum fluid batch size achievable with the equipment used for standard approaches (e.g. periodical closure of the propping agent containing output).

Thus, said technical solution discloses a method of reducing the size of not propping agent containing fluid (pure fluid) batches at the mixer and a method of arranging the hydraulic fracturing wellhead equipment system. To illustrate the method developed herein we will below consider the simplest case (FIG. 1) when the well treatment system 10 comprises a continuous action mixer 11 and two similar length routes 12, 13 connected to separate pumps 14, 15 operating in similar modes 16, 17. In this case the well input propping agent concentration profile 18 will be similar to that at the mixer output 19. This condition is accepted as the main assumption for said technical solution without taking into account batch profile smearing in the wellhead equipment and pipelines.

Importantly, the number of fluid delivery routes can be in practice greater than two and be arbitrary in a general case. The invention disclosed herein is not limited by the use of two fluid delivery routes.

If different length routes are used for the wellhead equipment and pipeline configuration, the concentration profiles of the initially split delivery batches are superimposed. Moreover, said concentration profiles are shifted by the time difference between the hydraulic fracturing fluid delivery durations over the different routes.

Thus, the shift between the different fluid delivery profiles is determined by options of fluid transporting over the different routes. There are many options of achieving such time shift. Some of these options will be considered before for the example of a two different length routes situation. Initially, one should determine the time shift as the time difference between the working fluid delivery durations over the different routes as follows:

$$Shift_{12} = \frac{L_1}{v_1} - \frac{L_2}{v_2} \quad (1)$$

where L is the pipeline length and v is the flow rate.

The flow rate is the following function of the difference in pressure, route length, pipeline diameter and fluid viscosity:

$$Shift_{12} = \frac{L_1}{q_1/A_1} - \frac{L_2}{q_2/A_2} = \frac{L_1}{\pi r_1^4 \Delta P_1 / 8\eta L_1 \pi r_1^2} - \frac{L_2}{\pi r_2^4 \Delta P_2 / 8\eta L_2 \pi r_2^2} \quad (2)$$

where q is the delivery volume rate, A is the pipeline section, r is the pipeline radius, ΔP is the pressure difference at the length L and η is the fluid viscosity.

Thus, the time shift equation is as follows:

$$Shift_{12} = \frac{L_1^2}{r_1^2 \Delta P_1 / 8\eta} - \frac{L_2^2}{r_2^2 \Delta P_2 / 8\eta} \quad (3)$$

For a more than one routes situation, the time shift should be described for each pair of routes; for the routes 1, 2 and 3 this will be the combination of pipeline pairs 1 and 2, 2 and 3, and 1 and 3, and the time shift will be $Shift_{12}$, $Shift_{13}$, $Shift_{23}$. Equation (3) can be used for calculating the time shift between propping agent concentration profiles.

Equation (3) can also be used for optimizing the final propping agent concentration profile at the well input. To this end, said equation should be added with equations of propping agent concentration in hydraulic fracturing fluid batches, its time duration and pure solution batch delivery length.

Analysis of Eq. (3) suggests three possible methods of achieving a time difference between the concentration profiles:
changing pipeline length
changing pipeline radius
changing pipeline pressure drop.

Generally, this invention discloses a method of reducing the not propping agent containing fluid batch (pure fluid batch) delivery duration. Said goal can be achieved by combining the following approaches:

Correct choice of wellhead equipment and its operation modes, including correct choice of hydraulic fracturing pump delivery rate and correct assembly of the treatment pipeline (pipeline lengths and diameters) as is required to achieve the time differences for different pipelines.

Choice of the initial pumping schedule, i.e. choice of the durations of consecutive propping agent containing and not propping agent containing fluid batches.

Generally, this technical solution is aimed at increasing the efficiency of a nonuniform propping agent structure hydraulic fracturing crack by pumping batches of propping agent containing fluid. The method disclosed in this invention can also be used for achieving short not propping agent containing fluid batch intervals if this is required for other technical purposes.

To check the abovementioned statements we designed a hydraulic fracturing arrangement for heterogeneous propping agent content in the crack. In according to the well treatment schedule, 5 sec long gel batches had to be alternated with 15 sec propping agent containing fluid batches. However, the minimum possible not propping agent containing fluid (pure fluid) batch length is 10 sec for the existing equipment.

Figure 2:
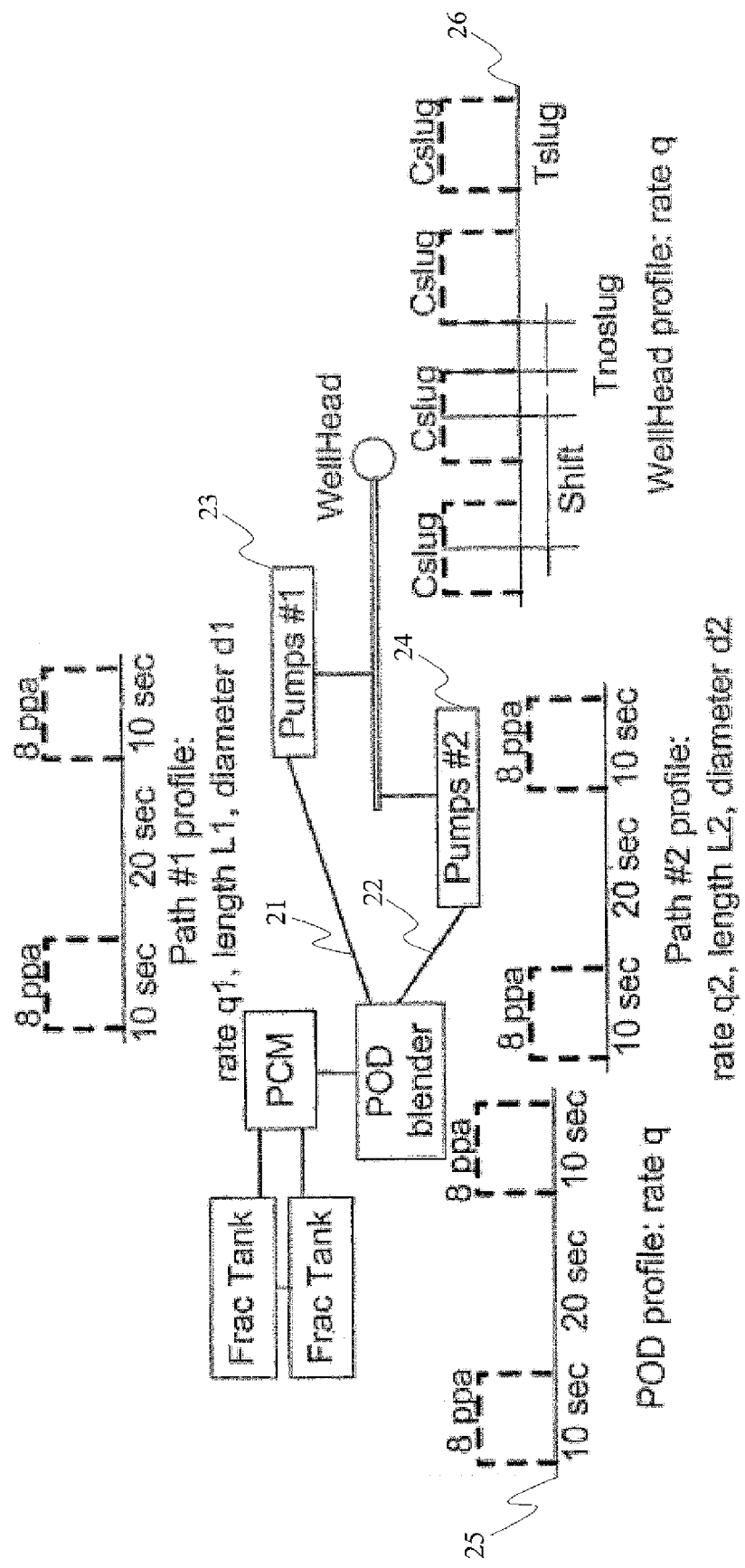
FIG. 2 shows another embodiment in accordance with the present invention.

We therefore chose a specific wellhead equipment configuration for reducing the not propping agent containing fluid batch length (FIG. 2). The equipment comprised two pipelines 21, 22 and two different capacity pumps 23, 24. To adhere to the well treatment schedule, we decided to set one of the pumps to 1.6 m³/min fluid delivery rate and the other pump to 3.2 m³/min fluid delivery rate. The propping agent containing fluid batch length was 10 sec, and the not propping agent containing fluid batch length was 20 sec 25. At the above pump capacity, part of the propping agent containing fluid batch is superimposed with the pure fluid batch. As a result, the 10 sec propping agent containing fluid batches are separated by 5 sec not propping agent containing fluid batches at the well input 26. Changing the fluid delivery rate is the most technically suitable system setting method. However, the same result can be achieved by changing pipeline length, diameter, or all the three parameters.

What is claimed is a:

1. A method for delivering a propping agent to a well, comprising:
    delivering, from an outlet of a mixer, a main stream of alternating batch intervals in which batches comprising the propping agent suspended in a fluid are separated for a first time difference by batches of fluid not comprising the propping agent;
    splitting the main stream into at least two flows having different volume delivery rates; and
    comingling the at least two flows before delivery to a hydraulic fracturing zone such that the first time difference is modified to a second time difference.

2. The method according to claim 1, wherein different volume delivery rates of the at least two flows are achieved by using different delivery pumps for pumping said flows.

3. The method according to claim 1, wherein different volume delivery rates of the at least two flows are achieved by using different diameters of pipelines over which said flows are pumped.

4. The method according to claim 1, wherein different volume delivery rates of the at least two flows are achieved by using different pipeline lengths.

5. The method of claim 1, wherein the second time difference is shorter than the first time difference.

6. A method for formation treatment, comprising:
    hydraulically fracturing a formation;
    creating a fluid flow from a mixer in a form of alternating batches of a fluid containing a propping agent and a fluid not containing a propping agent;
    splitting the fluid flow into at least two flows having different volume delivery rates;
    commingling the at least two flows, thereby reducing a time difference between the batches of fluid containing a propping agent; and
    filling a created fracture, wherein the different volume delivery rates are provided by a choice of a parameter of pipelines for the at least two flows.

7. The method according to claim 6, wherein the parameter of the pipelines is a diameter.

\* \* \* \* \*